Feb. 13, 1968  M. A. FULLER ET AL  3,368,873
APPARATUS FOR PROVIDING A PRESERVING ATMOSPHERE
Filed Oct. 17, 1963
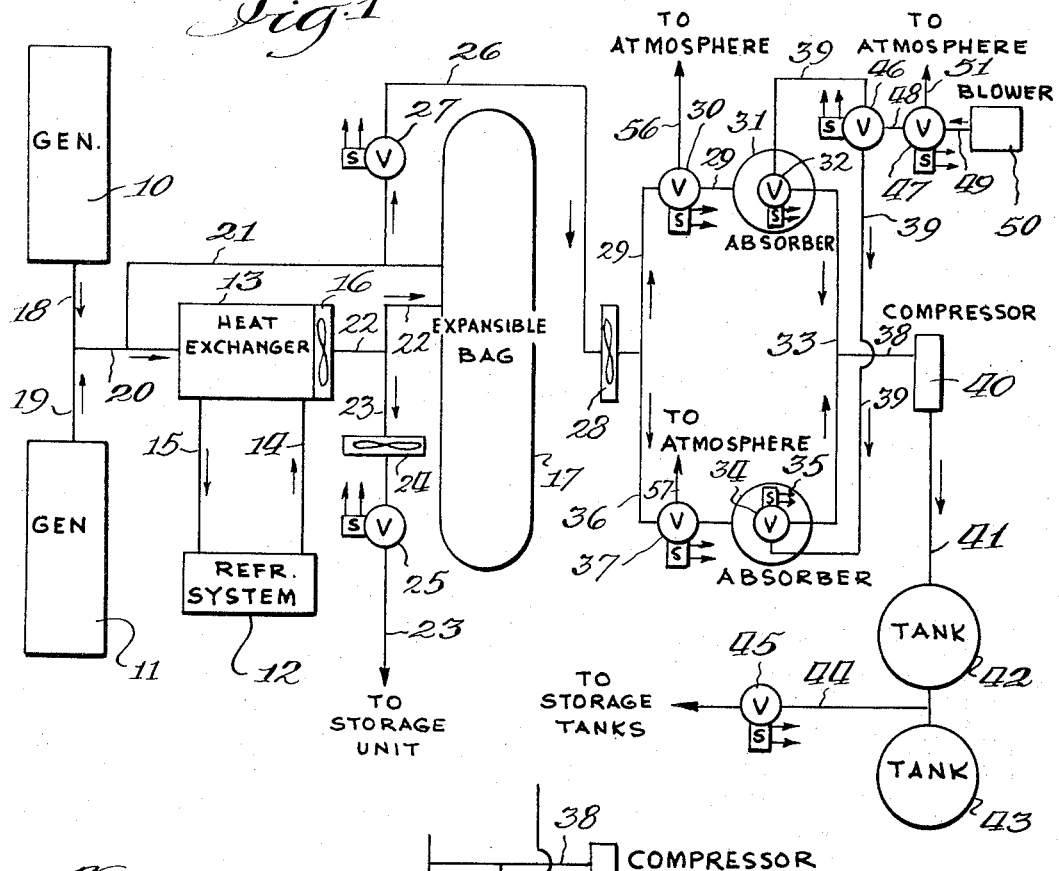
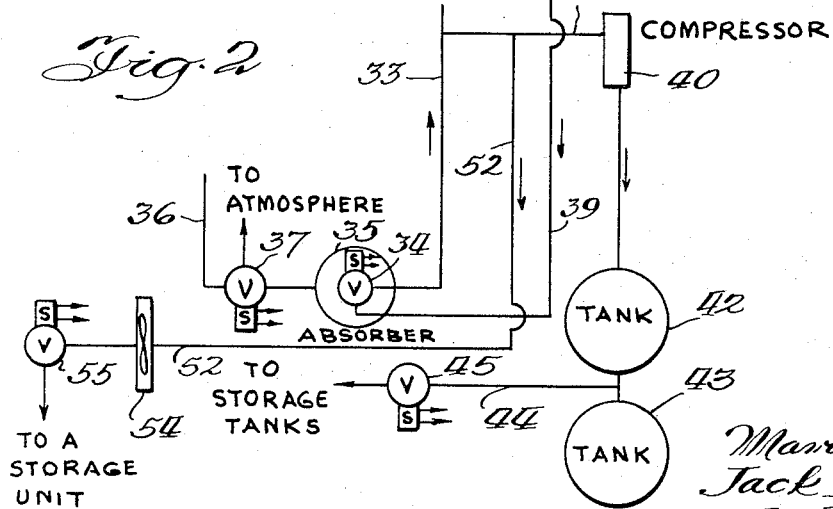

United States Patent Office 3,368,873
Patented Feb. 13, 1968

3,368,873
APPARATUS FOR PROVIDING A PRESERVING ATMOSPHERE
Marvin A. Fuller, Benton Harbor, Jack I. Anderson, Stevensville, and Roy W. Kruggel, St. Joseph, Mich., assignors to Whirlpool Corporation, a corporation of Delaware
Filed Oct. 17, 1963, Ser. No. 317,004
5 Claims. (Cl. 23—281)

ABSTRACT OF THE DISCLOSURE

An atmosphere generating system, preferably transportable, to permit continuous operation of atmosphere generating equipment for selectively supplying either an expansible atmosphere storage reservoir, or compressed atmosphere storage tanks, or fixed or transportable food storage containers. During peak utilization periods, the atmosphere in the reservoir or the compressed tanks can be selectively utilized to supply the food storage container.

---

This invention relates to an apparatus for providing a preserving atmosphere for the preserving of perishable plant and animal materials, and particularly to such an apparatus that is designed to lend itself to easy portability, to being moved, for example, into the fields and orchards and other places where perishable materials are being harvested or collected.

In Bedrosian and Brody Patent 3,102,777, assigned to the same assignee as the present application, there is disclosed an apparatus and method of preserving animal and plant materials in which a preserving atmosphere is utilized having an amount of oxygen less than that found in normal air and an amount of carbon dioxide greater than that found in normal air in order to retard but not prevent respiratory changes in stored animal and plant materials.

In Lannert et al. application Ser. No. 213,398, filed July 30, 1962 now Patent 3,205,049 and also assigned to the same assignee, there is disclosed an apparatus for generating such an atmosphere including absorber means for reducing the amount of carbon dioxide from the generator when such amount is excessive for the particular product being stored.

In the present invention one of the features is to provide an improved apparatus in which a storage atmosphere is produced together with means for either collecting it preparatory to use or conveying it directly to the storage unit containing the animal or plant materials being stored and also including means for reducing the amount of carbon dioxide from the generated atmosphere where such is desired.

Another feature of the invention is to provide such an improved apparatus including second collecting means into which the atmosphere may be collected for future use subsequent to the removal of desired portions of the carbon dioxide.

Still another feature of the invention is to provide such an apparatus in which a portion of the storage atmosphere is directed into the storage unit containing the materials to be preserved or stored while another portion is directed into the collecting means.

Other features and advantages of the invention will be apparent from the following description thereof taken in conjunction with the accompanying drawings. Of the drawings:

FIGURE 1 is a semi-diagrammatic flow sheet illustrating one embodiment of the invention.

FIGURE 2 is a fragmentary flow sheet illustrating a second embodiment of the invention.

In the apparatus of this invention the preserving atmosphere is generated and then is either collected for future use, directed into a storage means for the perishable materials or a portion of the atmosphere is collected while another portion is directed into the storage means.

In the embodiment of FIGURE 1 the generated atmosphere is either directed into the storage unit or means, collected for future use, or treated to remove desired amounts of carbon dioxide and then compressed and stored for future use.

In the embodiment of FIGURE 1 there is provided a pair of generators 10 and 11 which are shown diagrammatically but are each of the general nature of the generator shown in the above Patent 3,205,049. There is also provided a refrigeration system 12 used to cool a heat exchanger 13 which may be an enclosed evaporator coil with refrigerant lines 14 and 15 connecting the system 12 and heat exchanger 13. A blower 16 is located adjacent the heat exchanger 13 for moving atmosphere therethrough.

Also included in the system is an expansible bag 17 which may be made of any gas tight flexible material such as plastic film but preferably of rubberized cloth. There are provided a line 18 from the generator 10, a line 19 from the generator 11, a common line 20 to the heat exchanger 13, a by-pass line 21 extending from the line 20 around the heat exchanger 13 to the bag 17, a line 22 from the blower 16 to the bag 17 and a line 23 from the line 22. In the line 23 there is located a second blower 24 and a solenoid operated valve 25. The line 23 leads to a storage unit in which the perishable materials, either animal or plant, are stored.

A by-pass line 26 is provided from the line 21 around the bag 17 and this line 26 also contains a solenoid operated valve 27. In the line 26 is a third blower 28 and line 26 connects to a line 29 which contains a solenoid valve 30. The line 29 is connected to the bottom of a carbon dioxide absorber 31 which is preferably of the same type as disclosed in the above-mentioned copending Patent 3,205,049.

At the top of this absorber 31 there is located a solenoid operated valve 32 connected to a line 33 which extends between valve 32 and a similar valve 34 on the top of a second carbon dioxide absorber 35. The bottom of this second absorber 35 is connected by a line 36 to the line 29 which leads from the third blower 28. This line 36 also contains a solenoid operated valve 37. The valves 32 and 34 at the top of the respective absorbers are connected by means of a line 33 to a compressor 40 by means of a line 38. The compressor 40 is connected by a line 41 to a pair of high pressure atmosphere storage tanks 42 and 43. These tanks are connected by means of a line 44 containing a solenoid operated valve 45 to auxiliary storage tanks.

Line 39 between the valves 32 and 34 contains a solenoid valve 46 which is connected to another solenoid valve 47 in a line 48 leading from the valve 46. The valve 47 has the line 48 to the valve 46, another line 49 to a blower 50 that blows atmospheric air and a third line 51 exhausting to atmosphere.

In the second embodiment of FIGURE 2 all parts are the same as in the embodiment of FIGURE 1 except that an additional line 52 is provided leading from line 38 and containing a fifth blower 54 and a solenoid valve 55. Line 52 leads to a storage unit or storage means that contains the animal or plant materials to be preserving by the preserving atmosphere.

The apparatus of this invention generates the preserving atmosphere which may be used directly in the storage unit or which may be modified by removing carbon dioxide and/or harmful trace gases such as ethylene, etc.

and then passing into the storage unit. Alternatively, the generated atmosphere may be cooled and it may also be stored if an excess is generated. If the carbon dioxide content of the atmosphere coming from the generator being used is correct for the animal or plant material being stored no further modification is required. However, if desired, the atmosphere from the generator may be reduced in carbon dioxide content and then compressed and stored for later use or may be passed into the storage unit containing the materials being preserved or both actions may take place simultaneously. In addition, the compressed storage atmosphere may be conveyed to storage containers on the storage unit itself.

In the preferred apparatus two generators are provided. Also in the preferred apparatus two carbon dioxide absorbers are provided with only one being used at a time while the other one is being regenerated by removing absorbed carbon dioxide as by blowing air through it. When the generated atmosphere is held in the collecting means for future use, it may be recirculated either periodically or continuously through the cooling heat exchanger to cool this atmosphere to a desired temperature before being used in the storage unit. When chilling of the atmosphere is unnecessary the atmosphere can be passed directly into the collecting means or can be conveyed directly into the storage unit. However, the major function of the heat exchanger 13 is to remove the water vapor from the atmosphere being generated by generators 10 and 11.

As discussed earlier, the apparatus of this invention lends itself readily to easy portability so that it can be used in the fields or orchards where crops are being harvested. In those instances, the storage unit itself is also preferably portable so that it can be used in the fields or orchards for storing the harvested products. Such a unit is disclosed in the copending application of A. L. Reiter et al. Patent 3,183,683.

In the embodiment of FIGURE 1 the generators 10 and 11 are operated to generate an atmosphere rich in carbon dioxide and poor in oxygen according to the method and apparatus disclosed in the above-mentioned copending Patent 3,205,049. This preserving atmosphere is conveyed through lines 18 and 19 to a common line 20. From this common line the atmoshpere may be conveyed through the evaporator heat exchanger 13 of the refrigeration system 12 and is drawn through this heat exchanger by means of a blower 16. From the blower the cooled atmosphere may be forced through the line 22 into the collecting means 17 here shown as an expansible bag. The function of the collecting means is threefold. First, the use of the bag eliminates the need of matching the generator output to the compressor 40 pumping rate. Second, its use avoids the possibility of realizing positive and negative pressures at the generators which could cause improper operation of the generators. Third, its use provides a reservoir of atmosphere for rapid "pull down" (a dilution of the initial atmosphere of storage containers as described in the above-identified copending Patent 3,183,683) of storage containers for perishable plant and animal materials.

If the atmosphere from the heat exchanger is to be used immediately it may be drawn through the line 23 by opening the valve 25 and forced by the blower 24 into the storage unit, as previously described, containing the animal or plant materials being preserved. Alternatively, the blower 16 may force a portion of the atmosphere through the line 22 into the bag 17 while another portion is forced by the blower 24 into the storage unit.

If cooling of the atmosphere is not necessary, the atmosphere may flow through the line 21 into the bag 17 by-passing the heat exchanger 13. From the bag 17 the atmosphere can be forced into the storage unit in the manner previously described by the blower 24.

In many instances of material storage the atmosphere as produced by the generators 10 and 11 may be used directly as indicated. For certain materials, however, it is necessary to reduce the carbon dioxide content. For this reason, the absorber units 31 and 35 are provided.

Generated atmosphere in the line 21 may be directed through the line 26 on opening the valve 27 and forced by the blower 28 into either absorber 31 or absorber 35. Thus, with the valve 30 open the blower 28 will force the atmosphere through the line 29 and through the valve 30 which is located at the bottom of the absorber and up through the absorber 31. The absorber absorbs carbon dioxide to provide a desired carbon dioxide percentage in the atmosphere in the manner described in the above-mentioned Patent 3,205,049. The carbon dioxide reduced atmosphere then flows through the open valve 32 at the top of the absorber, through the lines 33 and 38 into the compressor 40. Here the atmosphere is compressed and forced into the tanks 42 and 43 for future use. From these tanks 42 and 43 the atmosphere will flow through line 44 on opening valve 45 into high pressure storage tanks on the storage unit, as shown in the above-mentioned copending Patent 3,183,683.

When absorber 31, for example, requires replenishing by removal of the absorbed carbon dioxide, valve 30 is closed and valve 37 is opened. Then the atmosphere from line 26 is forced by blower 28 into line 36 and through valve 37 at the bottom of the absorber 35 into the absorber. The atmosphere flows upwardly through the absorber for removal of a desired amount of carbon dioxide and then flows through the top open valve 34 into the line 33. From lines 33 and 38 the atmosphere is compressed in the manner previously described.

While absorber 35 is being thus utilized to remove carbon dioxide, absorber 31 is being reactivated by forcing air through it in the opposite direction. Thus, blower 50 forces air through line 49, valve 47, line 48 and valve 46 into line 39. From line 39 the air is forced through the open valve 32 down through the absorber bed in the absorber 31 and through valve 30 into line 56 which exhausts to atmosphere. This reverse flow of air through the absorber 31 removes absorbed carbon dioxide and prepares the absorber for future operation.

Similarly, when absorber 31 is being used and absorber 35 reactivated the air from blower 50 is directed by valve 46 into line 39 and from there downwardly through the absorber bed in absorber 35 by way of the valve 34. The air with removed carbon dioxide then is exhausted through line 57 from valve 37 into the atmosphere.

In FIGURE 2 there is illustrated a portion of a second embodiment of the invention with parts of this embodiment being the same as those in FIGURE 1. Thus, they are not again illustrated in FIGURE 2. In this embodiment the atmosphere containing the reduced amount of carbon dioxide from absorber 31 or absorber 35 is passed through line 33 into the compressor 40 for storage in the tanks 42 and 43 and for transfer by way of line 44 and valve 45 into the storage tanks on the storage unit as previously described. However, the atmosphere from the absorbers is withdrawn from line 38 by way of line 52 and forced by blower 54 through valve 55 into a storage unit. Thus, with this embodiment another storage unit may be provided with preserving atmosphere at the same time a first storage unit is being provided with preserving atmosphere.

In actual operation the atmosphere from the generators 10 and 11 or from the absorbers 31 or 35 containing a relatively large amount of carbon dioxide is forced into the storage unit containing air. As the atmosphere displaces the air the resulting mixture of atmosphere and air increases in carbon dioxide and decreases in oxygen so that the desired carbon dioxide and oxygen content in the unit may be achieved. As is explained in the above-mentioned Patent 3,102,777, this amount of oxygen is less than that found in normal air in order to retard but not prevent the progress of the aging respiratory change equation explained in this patent. Similarly, the amount of carbon dioxide is greater than that found in normal air also to retard but not prevent the progress of the equation. As is further explained in this patent, for most animal and plant materials the amount of oxygen in the atmosphere in the storage unit is maintained between approximately 1% and 10% by volume of the atmosphere and the carbon dioxide is maintained from approximately 0.5–6 times the amount by volume of oxygen with the percentage amount of carbon dioxide being preferably from about 1–15% by volume when the amount of oxygen is between about 1–10%. When the cooling means such as the heat exchanger 13 used in either the embodiment of FIGURE 1 or FIGURE 2, the preferred minimum temperature is about 29° F. for most animal and plant materials and the preferred maximum temperature will be about 120° F.

As mentioned previously, the apparatus of this invention provides means for generating an atmosphere for preserving animal and plant materials that is readily portable so that it can be moved to any desired location such as the fields or orchards when the materials to be stored are being harvested. The storage units which are charged with this atmosphere may themselves be portable such as being located on trucks, ships or other transportation means so that the stored articles may be preserved while being transferred to market or to designations such as warehouses for longer storage periods.

Having described our invention as related to the embodiments shown in the accompanying drawings, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. Apparatus for providing a preserving atmosphere for the preservation of perishable plant and animal material in a storage means, comprising: generating means for generating said atmosphere having an amount of carbon dioxide greater than that in ambient air; atmosphere conduit means for said atmosphere leading from said generating means; collecting means for collecting said atmosphere communicating with said atmosphere conduit means to receive atmosphere therefrom; a storage means conduit communicating with said atmosphere conduit means and leading to a storage means; cooling means communicating with said atmosphere conduit means prior to said collecting means for cooling said atmosphere; and recirculating conduit means interconnecting said cooling means and said collecting means for recirculating atmosphere from said collecting means through said cooling means and back to said collecting means.

2. Apparatus for providing a preserving atmosphere for the preservation of perishable plant and animal material in a storage means, comprising: generating means for generating said atmosphere having an amount of carbon dioxide greater than that in ambient air; atmosphere conduit means for said atmosphere leading from said generating means; first collecting means for collecting said atmosphere communicating with said atmosphere conduit means to receive atmosphere therefrom; a storage means conduit communicating with said atmosphere conduit means and leading to a storage means; carbon dioxide removing means for removing carbon dioxide from said atmosphere communicating with said atmosphere conduit means; conduit means connected to said atmosphere conduit means, collecting means and removing means for flowing said atmosphere selectively into said collecting means and said removing means; a second collecting means; conduit means connected to said removing means and second collecting means for flowing atmosphere from said removing means into said second collecting means; and a storage means conduit communicating with said second collecting means and leading to said storage means.

3. The apparatus of claim 2 wherein there are provided refrigerated cooling means communicating with said atmosphere conduit means prior to said collecting means for cooling said atmosphere.

4. The apparatus of claim 2 wherein there are provided compressing means in said conduit means that is connected to said removing means and second collecting means for compressing said atmosphere prior to said second collecting means.

5. The apparatus of claim 2 wherein there are provided atmosphere conduit means prior to said collecting means for cooling said atmosphere and compressing means in said conduit means that is connected to said removing means and second collecting means for compressing said atmosphere prior to said second collecting means.

References Cited
UNITED STATES PATENTS

| | | | |
|---|---|---|---|
| 146,723 | 1/1874 | Tiffany | 48—178 |
| 2,247,625 | 7/1941 | Willenborg | 23—28 X |
| 2,772,952 | 12/1956 | Jacobs | 23—281 |
| 2,955,940 | 10/1960 | Williams | 99—189 |
| 3,203,771 | 8/1965 | Brown et al. | 23—281 |

JAMES H. TAYMAN, Jr., *Primary Examiner.*

UNITED STATES PATENT OFFICE
CERTIFICATE OF CORRECTION

Patent No. 3,368,873            February 13, 1968

Marvin A. Fuller et al.

It is hereby certified that error appears in the above numbered patent requiring correction and that the said Letters Patent should read as corrected below.

Column 6, line 35, after "provided" insert -- refrigerated cooling means communicating with said --.

Signed and sealed this 20th day of May 1969.

(SEAL)
Attest:

Edward M. Fletcher, Jr.
Attesting Officer

Commissioner of Patents